(12) United States Patent
Tatake et al.

(10) Patent No.: US 7,746,803 B2
(45) Date of Patent: Jun. 29, 2010

(54) AUDIO APPLICATION PROGRAMMING INTERFACE

(75) Inventors: Ashutosh V. Tatake, Seattle, WA (US);
Dugan O. Porter, Seattle, WA (US);
Duncan J. McKay, Redmond, WA (US);
Robert S. Williams, Seattle, WA (US);
Stephen R. Handley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1307 days.

(21) Appl. No.: 11/241,004

(22) Filed: Sep. 30, 2005

(65) Prior Publication Data
US 2007/0084326 A1    Apr. 19, 2007

(51) Int. Cl.
*H04L 12/56* (2006.01)
*H04J 1/16* (2006.01)

(52) U.S. Cl. ..................... 370/252; 370/412; 370/419

(58) Field of Classification Search ........... 370/412, 370/419, 252
See application file for complete search history.

(56) References Cited

U.S. PATENT DOCUMENTS 5,995,884 A  * 11/1999  Allen et al. ............. 701/24

* cited by examiner

*Primary Examiner*—John Pezzlo
(74) *Attorney, Agent, or Firm*—Woodcock Washburn LLP

(57) ABSTRACT

An audio application programming interface (API) enables an audio processing graph to be modified during processing. If they are received while the audio graph is playing or paused, graph modifying commands may be inserted into either an asynchronous command queue or a deferred command queue. The audio API may also include a clock manager for synchronizing clocks from a number of different connected audio rendering devices, applications, processors, functions, operations, modules, or other resources. The clock manager may provide an interface that enables a number of control groups to be defined. Each such control group may include a master clock, a slave clock, and a control.

15 Claims, 4 Drawing Sheets

AUDIO APPLICATION PROGRAMMING INTERFACE

BACKGROUND

Audio application programming interfaces (API's) may enable a wide variety of applications to set up complex audio processing graphs and to render audio output to a variety of different output devices. During processing of such a graph, it may be desirable to make a number of changes that modify the structure and/or state of the graph. For example, it may be desirable to add a new filter path to the graph. This may involve, for example, creating and adding a new voice and also a number of filters to mix points in the existing graph. Additionally, it may be desirable to modify a path of an existing filter. This may involve, for example, changing a source buffer of a voice, swapping filters, inserting new filters, or removing filters. A drawback of conventional audio API's is that they are limited with respect to their ability to allow changes to such graphs while the graphs are being processed without negatively affecting overall performance.

Audio API's may also have the ability to separate audio processing from rendering. This and other features of audio API's may create a number of clock synchronization issues that arise when an audio API is connected to audio rendering devices, applications, and processors that are using different clocks. For example, one problematic scenario may arise when a connected rendering device is consuming audio samples at a different rate than an audio API and/or a digital signal processor is producing the samples. Another problematic scenario may arise when the audio API is connected to a number of different rendering devices that are each consuming audio samples at a slightly different rate. Thus, another drawback of conventional audio API's is that they are limited with respect to their ability to coordinate clock synchronization among different connected audio rendering devices, applications, and processors.

SUMMARY

An audio application programming interface (API) enables an audio processing graph to be modified during processing. If they are received while the audio graph is playing or paused, graph modifying commands may be inserted into either an asynchronous command queue or a deferred command queue. All pending commands in the asynchronous queue may be executed on a next processing pass. However, all pending commands in the deferred queue will not necessarily be executed on the next processing pass. Rather, commands in the deferred queue will be processed in accordance with a commit marker that is inserted into the deferred queue. On the next processing pass, all commands that are ahead of the commit marker in the deferred queue may be processed atomically, while all commands that are behind the commit marker may remain unprocessed in the deferred queue.

The audio API may include a clock manager for synchronizing clocks from a number of different connected audio rendering devices, applications, processors, functions, operations, modules, or other resources. The clock manager may provide an interface that enables a number of control groups to be defined. Each such control group may include a master clock, a slave clock, and a control. For each control group, the clock manager may monitor the rate of the master clock in comparison to the rate of the corresponding slave clock. If the master clock rate is not sufficiently synchronized with the corresponding slave clock rate, then the clock manager may use the control to adjust the slave clock rate to conform with the master clock rate.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
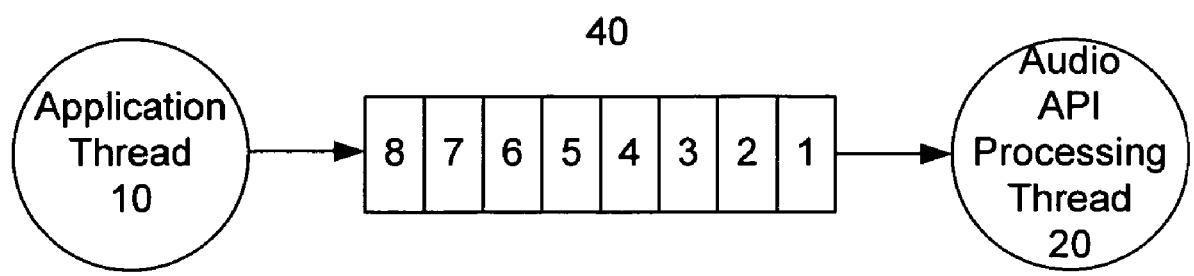
FIG. 1 depicts an exemplary asynchronous processing queue.

As set forth above, during processing of an audio graph, it may be desirable to make a number of changes that modify the structure and/or state of the graph. Changes that modify the structure of the graph may be referred to as graph modifying commands, while changes that modify the state of a graph may be referred to as parameter modifying commands A graph modifying command may be, for example, a command to create or delete a voice, a command to create or delete a return, or a command to create or delete a filter. A parameter modifying command may be, for example, a command to start a return, a command to stop a return, a command to start a voice, a command to stop a voice, a command to set a loop region, a command to set a source for a voice, a command to set a destination for a voice, or a command to set a parameter on a filter.

Graph safe commands are commands that have no impact on a running graph. Graph safe commands may include, for example, a command to create a buffer or a command to get a graph state. Because graph safe commands have no impact on a running graph, they may be safely executed immediately. By contrast, because graph modifying commands and parameter modifying commands will modify the structure and/or state of the graph, they may, in certain circumstances, be unsafe to execute immediately because they may result in unwanted side effects. In particular, when an application requests information about the structure or state of the graph, it is important to provide an accurate snapshot of the graph to the application. However, because they will modify the structure and/or state of the graph, graph modifying commands and parameter modifying commands may prevent an accurate snapshot of the graph from being returned to the application.

To assist in identifying when it safe and unsafe to immediately execute graph modifying commands and parameter modifying commands, graph processing may be divided into two modes: synchronous mode and asynchronous mode. While the graph is stopped, there are no potential side effects from processing graph modifying commands and parameter modifying commands immediately. Thus, the graph is considered to be in synchronous mode when it is stopped. Alternatively, while the graph is playing or paused, there are a number of potential side effects which may result from processing graph modifying commands and parameter modifying commands immediately. Thus, the graph is considered to be in asynchronous mode when it is playing or paused.

An exemplary table that shows when the different commands types are executed during the different processing modes is shown below.

| Processing Mode | Graph-Safe Commands | Graph Modifying Commands | Parameter Modifying Commands |
|---|---|---|---|
| Synchronous | Immediate | Immediate | Immediate |
| Asynchronous | Immediate | Non-immediate | Non-immediate |

As shown in the table above, it is safe to execute graph modifying commands immediately, regardless of whether the graph is in synchronous or asynchronous mode. It is also safe to execute graph modifying commands and parameter modifying commands immediately while the graph processing is in synchronous mode. However, while the graph processing is in asynchronous mode, it may be unsafe to execute graph modifying commands and parameter modifying commands immediately, and, therefore, they are not executed immediately.

Commands that are not executed immediately may be divided into two categories: asynchronous commands and deferred commands. Asynchronous commands are placed in an asynchronous queue, while deferred commands are placed into a deferred queue. The commands are placed in each queue in the order that they are received. All pending commands that are placed in the asynchronous queue will be executed during the next processing pass. By contrast, the pending commands in the deferred queue will not necessarily be executed during the next processing pass. Rather, deferred commands will remain in the deferred queue until a commit marker is inserted into the deferred queue. After a commit marker has been inserted into the deferred queue, all commands that are ahead of the commit marker in the deferred queue will be atomically executed during the next processing pass. Commands that are behind the commit marker in the deferred queue will not be executed during the next processing pass. Rather, they will remain in the deferred queue until another commit marker is inserted and a subsequent processing pass occurs. The commands ahead of the commit marker in the deferred queue are executed "atomically," meaning that the commands are executed as a group without any intermittent operations being performed.

In addition to the commit marker, a rollback marker may also be placed in the deferred queue. On the next processing pass, the client application will have the opportunity to cancel or execute any of the commands in the deferred command queue that are ahead of the rollback marker An exemplary asynchronous command queue 40 is shown in FIG. 1. Commands 1-8 are received from application thread 40 and are placed in the asynchronous queue 40 until they are processed by audio API processing thread 20. Commands 1-7 are placed in the asynchronous queue 40 in the order that they are received. On the next audio API processing pass, commands 1-7 will all be executed.

Figure 2:
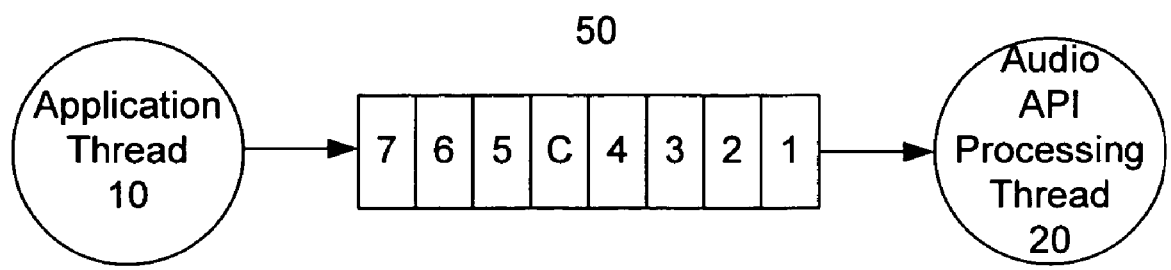
FIG. 2 depicts an exemplary deferred processing queue.

An exemplary deferred command queue 50 is shown in FIG. 2. Commands 1-7 and commit marker C are placed in the deferred command queue 50 in the order that they are received. Commands 1-4 are received before commit marker C, and, therefore, they are placed in the deferred queue 50 ahead of commit marker C. Commands 5-7 are received after commit marker C, and, therefore, they are placed in the deferred queue 50 behind commit marker C. Because they are ahead of the commit marker, commands 1-4 will be atomically executed on the next audio API processing pass. Commands 1-4 may then be cleared from the deferred queue 50. Because they are behind the commit marker, commands 5-7 will not be executed on the next processing pass. Rather, they will remain in the deferred queue 50 until another commit marker is inserted and a subsequent processing pass occurs.

In addition to the occurrence of a processing pass, switching processing from asynchronous mode to synchronous mode (from play to stop or from pause to stop) may cause all pending asynchronous and deferred commands to be executed. Thus, switching from asynchronous mode to synchronous mode may be considered an implicit processing pass with an implicit commit marker.

Figure 3:
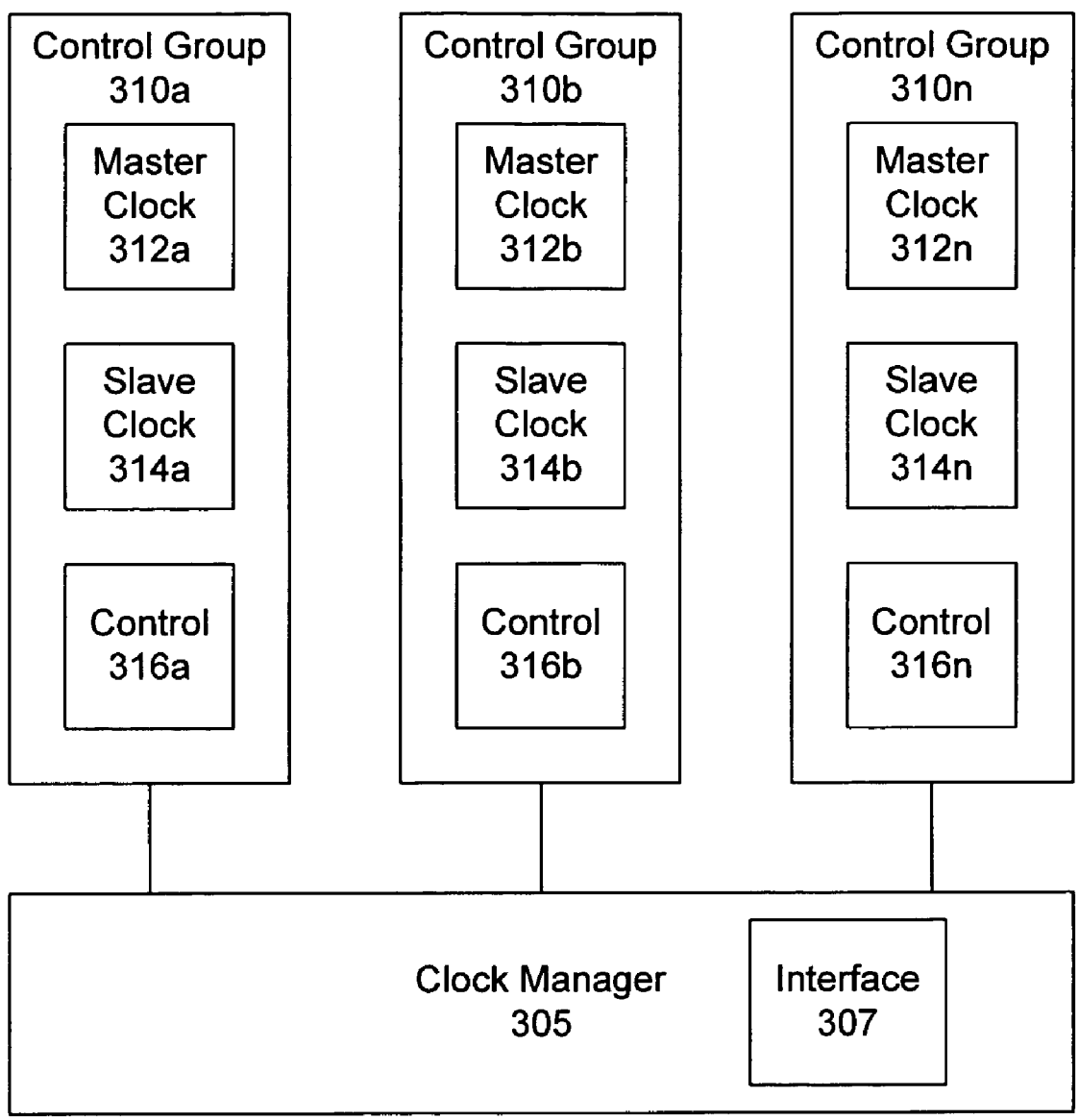
FIG. 3 depicts an exemplary clock management system.

In addition to command processing, another challenge related to audio API's involves clock management. In particular, as set forth above, audio API's may operate in connection with a number of different audio rendering devices, applications, processors, functions, operations, modules, or other resources, each using a different clock. This may create a number of concerns when the clocks for these devices are not synchronized. An exemplary clock management system 300 is shown in FIG. 3. Clock management system 300 includes a number of control groups 310a-n. Although three control groups are shown in FIG. 3, a clock management system may include any number of control groups. Each such control group includes a respective master clock 312a-n, a corresponding respective slave clock 314a-n, and a respective control 316a-n. Each master clock 312 and slave clock 314 may correspond to an audio rendering device, application, processor, function, operation, module, or other resource that is used in connection with the audio API, or to the audio API itself. For example, each master clock 312 may correspond to a different audio rendering device, while each slave clock 314 may correspond to the audio API or to a connected digital signal processor (DSP).

Clock management system 300 also includes a clock manager 305. Clock manager 305 includes an interface 307 that enables control groups 310 to be defined by registering a master clock 312, a corresponding slave clock 314, and, if necessary, a control 316 for each control group 310. Clock manager 305 is also responsible for monitoring control groups 310a-n to ensure that each master clock 312 is sufficiently synchronized with its corresponding slave clock 314. To accomplish this, clock manager 305 may compare the rate at which a master clock consumes samples against the rate at which a corresponding slave clock produces samples. If the difference between the master and slave rates is more than an acceptable threshold difference, then clock manager 305 may use the control group's respective control 316 to adjust the rate at which the slave is producing samples.

A number of methods may be employed to determine whether the slave is sufficiently synchronized with the master. For example, on an initial processing pass, clock manager 305 may obtain starting positions for a master clock and its corresponding slave clock. On each subsequent processing pass, clock manager 305 may obtain current positions for the master clock and its corresponding slave. The master absolute progress may then be calculated by subtracting the master starting position from the master current position, and the slave absolute progress may be calculated by subtracting the slave starting position from the slave current position. The slave absolute clock rate may then be calculated by dividing the slave absolute progress by the master absolute progress. The error in the slave clock's rate may then be calculated by subtracting the slave absolute clock rate from the number 1. This error may then be filtered and compared with other measurements such as, for example, the slave's rate of change since the most recent processing pass.

Figure 4:
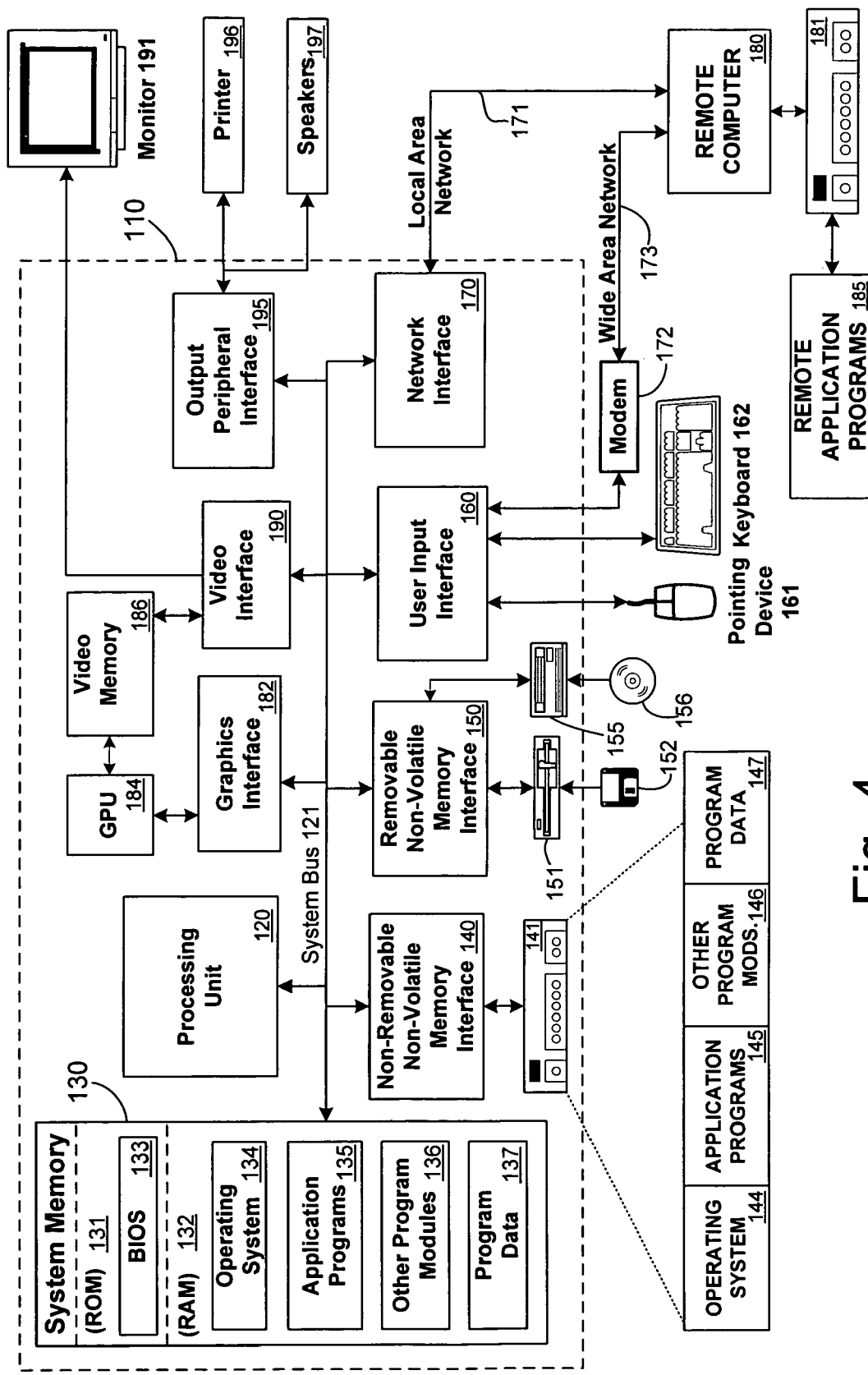
FIG. 4 is a block diagram representing an exemplary computing device.

FIG. 4 illustrates an example of a suitable computing system environment 100 in which the subject matter described above with reference to FIGS. 1-3 may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 4, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146 and program data 147. Note that these components can either be the same as or different from operating system 134, application programs 135, other program modules 136 and program data 137 programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer-readable storage medium having stored thereon computer-executable instructions for performing steps comprising:
   receiving commands and a commit instruction, at least one of the commands being received before the commit instruction and at least one of the commands being received after the commit instruction;
   inserting the commands and the commit instruction into a deferred command queue such that they are positioned in the deferred command queue in the order that they were received; and
   conducting a processing pass that atomically executes each command that is positioned ahead of the commit instruction in the deferred command queue and that does not execute each deferred command that is positioned behind the commit instruction in the deferred command queue.

2. The computer-readable storage medium of claim 1, wherein receiving commands comprises receiving commands while an audio processing graph is operating in an asynchronous processing mode.

3. The computer-readable storage medium of claim 2, wherein the audio processing graph is operating in the asynchronous processing mode while the audio processing graph is in one of a play and a pause state.

4. The computer-readable storage medium of claim 1, having further computer-executable instructions for performing the steps of:
   inserting the rollback instruction into the deferred command queue; and
   conducting another processing pass that requests instructions from a client application for canceling or for executing each command that is positioned ahead of the rollback instruction in the deferred command queue.

5. The computer-readable storage medium of claim 1, having further computer-executable instructions for performing the steps of:
   receiving instructions to switch operation of the audio processing graph from an asynchronous processing mode to a synchronous processing mode; and
   responsively atomically executing all commands remaining in the deferred command queue.

6. The computer-readable storage medium of claim 1, wherein the commands comprise an audio processor graph modifying command that modifies a structure of an audio processing graph.

7. The computer-readable storage medium of claim 6, wherein the audio processor graph modifying command is one of a command to create a voice, a command to delete a voice, a command to create a return, a command to delete a return, a command to create a filter, and a command to delete a filter.

8. The computer-readable storage medium of claim 1, wherein the commands comprise an audio processor parameter modifying command that modifies a state of an audio processor graph.

9. The computer-readable storage medium of claim 8, wherein the audio processor parameter modifying command is one of a command to start a return, a command to stop a return, a command to start a voice, a command to stop a voice, a command to set a loop region, a command to set a source for a voice, a command to set a destination for a voice, and a command to set a parameter on a filter.

10. A method for managing command execution comprising:
    receiving a command to modify an audio processing graph;
    if processing of the audio processing graph is stopped, then executing the command immediately; and
    if processing of the audio processing graph is not stopped, then inserting the command into a deferred command queue, in which the command will be processed during a next processing pass after a commit instruction is received.

11. The method of claim 10, wherein executing the command immediately comprises:
    determining that the audio processing graph is operating in a synchronous mode; and
    responsively executing the command immediately.

12. The method of claim 10, wherein inserting the command into a deferred command queue comprises:
    determining that the audio processing graph is operating in an asynchronous mode;
    designating the command as a deferred command; and
    responsively inserting the command into a deferred command queue.

13. The method of claim 12, wherein determining that the audio processing graph is operating in an asynchronous mode comprises determining that the audio processing graph is operating in one of a play state and a pause state.

14. The method of claim 10, comprising receiving a command to modify a state of the audio processing graph.

15. The method of claim 10, comprising receiving a command to modify a structure of the audio processing graph.

* * * * *